(12) United States Patent
Soga (10) Patent No.: US 8,019,456 B2
(45) Date of Patent: Sep. 13, 2011

(54) PRODUCT REPAIR SUPPORT SYSTEM, PRODUCT MANUFACTURING SYSTEM, AND PRODUCT MANUFACTURING METHOD

(75) Inventor: Akira Soga, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 408 days.

(21) Appl. No.: 12/037,406

(22) Filed: Feb. 26, 2008

(65) Prior Publication Data
US 2008/0208381 A1 Aug. 28, 2008

(30) Foreign Application Priority Data

| | | |
|---|---|---|
| Feb. 27, 2007 | (JP) | 2007-048009 |
| Jun. 26, 2007 | (JP) | 2007-167438 |
| Jan. 11, 2008 | (JP) | 2008-004885 |

(51) Int. Cl.
*G06F 19/00* (2006.01)
(52) U.S. Cl. ........ 700/110; 700/105; 700/116; 700/117; 702/84
(58) Field of Classification Search .................. 700/105, 700/108–110, 115–117; 702/84
See application file for complete search history.

(56) References Cited

U.S. PATENT DOCUMENTS

| | | | | |
|---|---|---|---|---|
| 5,831,854 A | * | 11/1998 | Yamamoto et al. | 700/95 |
| 6,859,676 B1 | * | 2/2005 | Kazemi | 700/110 |
| 2006/0129265 A1 | * | 6/2006 | Ouchi | 700/110 |

FOREIGN PATENT DOCUMENTS

JP 2005-190026 7/2005
* cited by examiner

*Primary Examiner* — Kakali Chaki
*Assistant Examiner* — Nathan Laughlin
(74) *Attorney, Agent, or Firm* — Oblon, Spivak, McClelland, Maier & Neustadt, L.L.P.

(57) ABSTRACT

A product repair support system is configured to support repair of a product rejected in an inspection based on a prescribed inspection standard. The product repair support system includes: repair information storage part; reference information storage part; and repair condition optimization part. The repair information storage part is configured to store a result of the inspection of the repaired product as repair information. The reference information storage part is configured to store reference information related to the product. The repair condition optimization part is configured to determine appropriateness of a repair condition or selection of the repair condition on basis of the repair information and, in response to a determination of being inappropriate, to optimize data of the repair condition or the selection on basis of at least one of the repair information and the reference information.

11 Claims, 8 Drawing Sheets

PRODUCT REPAIR SUPPORT SYSTEM, PRODUCT MANUFACTURING SYSTEM, AND PRODUCT MANUFACTURING METHOD

CROSS-REFERENCE TO RELATED APPLICATIONS

This application is based upon and claims the benefit of priorities from the prior Japanese Patent Application No. 2007-048009, filed on Feb. 27, 2007, the prior Japanese Patent Application No. 2007-167438, filed on Jun. 26, 2007 and the prior Japanese Patent Application No. 2008-004885, filed on Jan. 11, 2008; the entire contents of which are incorporated herein by reference.

BACKGROUND OF THE INVENTION

1. Field of the Invention

This invention relates to a product repair support system, a product manufacturing system, and a product manufacturing method.

2. Background Art

A product data accumulation part is known in which the data of rejected (nonconforming) products occurring in the process of manufacturing products is accumulated for use in repairing the products. In practice, a determination is made as to which portion of the product is to be repaired on the basis of the data accumulated in the accumulation part and the repairer's experience.

However, repair determination eventually depends on the repairer's experience. Hence repair determination is difficult for persons without repair experience, and unfortunately, it is difficult to efficiently repair rejected products.

In this context, a technique for supporting repair determination is proposed so that even a person without repair experience can do efficient repair (see JP-A 2005-190026(Kokai), hereinafter referred to as Patent Document 1).

In the technique disclosed in Patent Document 1, when the inspection result of a repaired product is acceptance, the data is stored in a database. However, when the inspection result of a repaired product is rejection, the data is not stored in the database, and no consideration is given to optimizing the content of the repair condition or the selection of the repair condition on the basis of the data.

Consequently, when the content or selection of the repair condition is inappropriate, occurrence of rejected products cannot be prevented, and there is a danger of repeating fruitless repair operations that do not result in an accepted (conforming) product.

SUMMARY OF THE INVENTION

According to an aspect of the invention, there is provided a product repair support system configured to support repair of a product rejected in an inspection based on a prescribed inspection standard, the product repair support system including: repair information storage part configured to store a result of the inspection of the repaired product as repair information; reference information storage part configured to store reference information related to the product; and repair condition optimization part configured to determine appropriateness of a repair condition or selection of the repair condition on basis of the repair information and, in response to a determination of being inappropriate, to optimize data of the repair condition or the selection on basis of at least one of the repair information and the reference information.

According to another aspect of the invention, there is provided a product repair support system configured to support repair of a product rejected in an inspection based on a prescribed inspection standard, the product repair support system including: repair information storage part configured to store a result of the inspection of the repaired product as component-related repair information for each component; reference information storage part configured to store reference information related to the product; and repair condition optimization part configured to determine appropriateness of a repair condition or selection of the repair condition on basis of the component-related repair information and, in response to a determination of being inappropriate, to optimize data of the repair condition or the selection on basis of at least one of the component-related repair information and the reference information.

According to another aspect of the invention, there is provided a product manufacturing system operable to perform assembly of an article, inspection based on a prescribed inspection standard after the assembly, and repair of a product rejected in the inspection, the product manufacturing system including: a product repair support system configured to support repair of a product rejected in an inspection based on a prescribed inspection standard; and removal part configured to remove a portion rejected in the inspection of the product, the product repair support system including: repair information storage part configured to store a result of the inspection of the repaired product as repair information; reference information storage part configured to store reference information related to the product; and repair condition optimization part configured to determine appropriateness of a repair condition or selection of the repair condition on basis of the repair information and, in response to a determination of being inappropriate, optimizing data of the repair condition or the selection on basis of at least one of the repair information and the reference information.

According to another aspect of the invention, there is provided a product manufacturing system operable to perform assembly of an article, inspection based on a prescribed inspection standard after the assembly, and repair of a product rejected in the inspection, the product manufacturing system including: a product repair support system configured to support repair of a product rejected in an inspection based on a prescribed inspection standard; and removal part configured to remove a portion rejected in the inspection of the product, the product repair support system including: repair information storage part configured to store a result of the inspection of the repaired product as component-related repair information for each component; reference information storage part configured to store reference information related to the product; and repair condition optimization part configured to determine appropriateness of a repair condition or selection of the repair condition on basis of the component-related repair information and, in response to a determination of being inappropriate, optimizing data of the repair condition or the selection on basis of at least one of the component-related repair information and the reference information.

According to another aspect of the invention, there is provided a product manufacturing method operable to perform assembly of an article, inspection based on a prescribed inspection standard after the assembly, and repair of a product rejected in the inspection, the product manufacturing method including: performing the inspection on the repaired product and accumulating a result thereof as repair information; determining appropriateness of a repair condition or selection of the repair condition on basis of the repair information and, in response to a determination of being inappropriate, optimizing data of the repair condition or the selection on basis of at least one of the repair information and reference information related to the product; and repairing the product on basis of the data of the repair condition or the selection of the repair condition being optimized.

According to another aspect of the invention, there is provided a product manufacturing method operable to perform assembly of an article, inspection based on a prescribed inspection standard after the assembly, and repair of a product rejected in the inspection, the product manufacturing method including: performing the inspection on the repaired product and accumulating a result thereof as component-related repair information for each component; determining appropriateness of a repair condition or selection of the repair condition on basis of the component-related repair information and, in response to a determination of being inappropriate, optimizing data of the repair condition or the selection on basis of at least one of the component-related repair information and reference information related to the product; and repairing the product on basis of the data of the repair condition or the selection of the repair condition being optimized.

DETAILED DESCRIPTION OF THE INVENTION

An embodiment of the invention will now be described with reference to the drawings.

Figure 1:
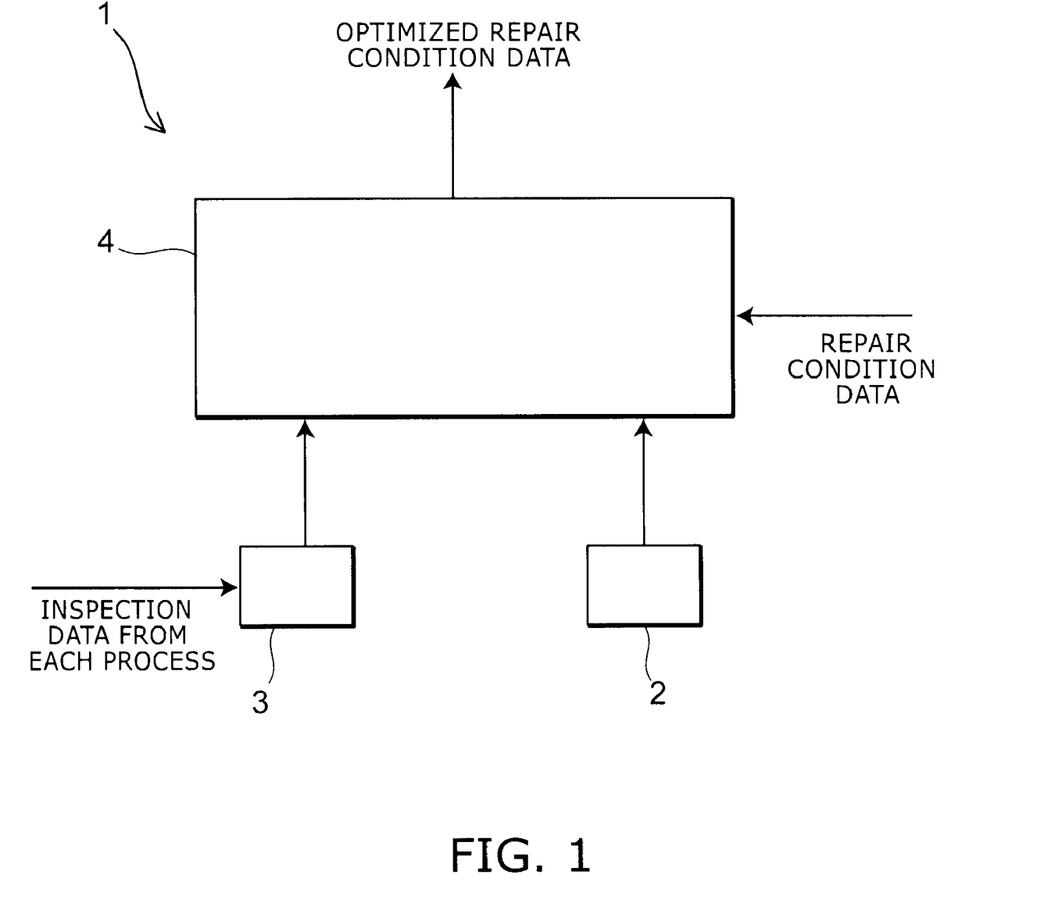
FIG. 1 is a block diagram for illustrating the schematic configuration of a product repair support system according to the embodiment of the invention.

FIG. 1 is a block diagram for illustrating the schematic configuration of a product repair support system according to the embodiment of the invention.

As shown in FIG. 1, the repair support system 1 comprises a reference information storage part 2, a repair information storage part 3, and a repair condition optimization part 4.

The repair condition optimization part 4 determines appropriateness of the repair condition or its selection on the basis of repair information from the repair information storage part 3 described later. In response to a determination of being inappropriate, the repair condition optimization part 4 optimizes the data of the repair condition or the selection of the repair condition on the basis of the repair information and the below-described reference information.

The reference information storage part 2 is connected to the repair condition optimization part 4 and provides reference information data to the repair condition optimization part 4. The reference information can illustratively be data of components and units constituting the product (for instance, inspection data of on-arrival inspection and/or offered by the manufacturer, manufacturer's name, lot number, time of manufacture, and product specifications), and repair histories of similar components and similar units.

The repair information storage part 3 is also connected to the repair condition optimization part 4 and provides repair information data to the repair condition optimization part 4. The repair information can illustratively be repair history data of the intended product (for instance, the latest repair site and repair method, and past repair sites and repair methods) and inspection history data of the intended product.

Next, a manufacturing system 100 including the repair support system 1 is described.

For convenience, a description is given of the case of assembling a product composed of a plurality of components and units.

Figure 2:
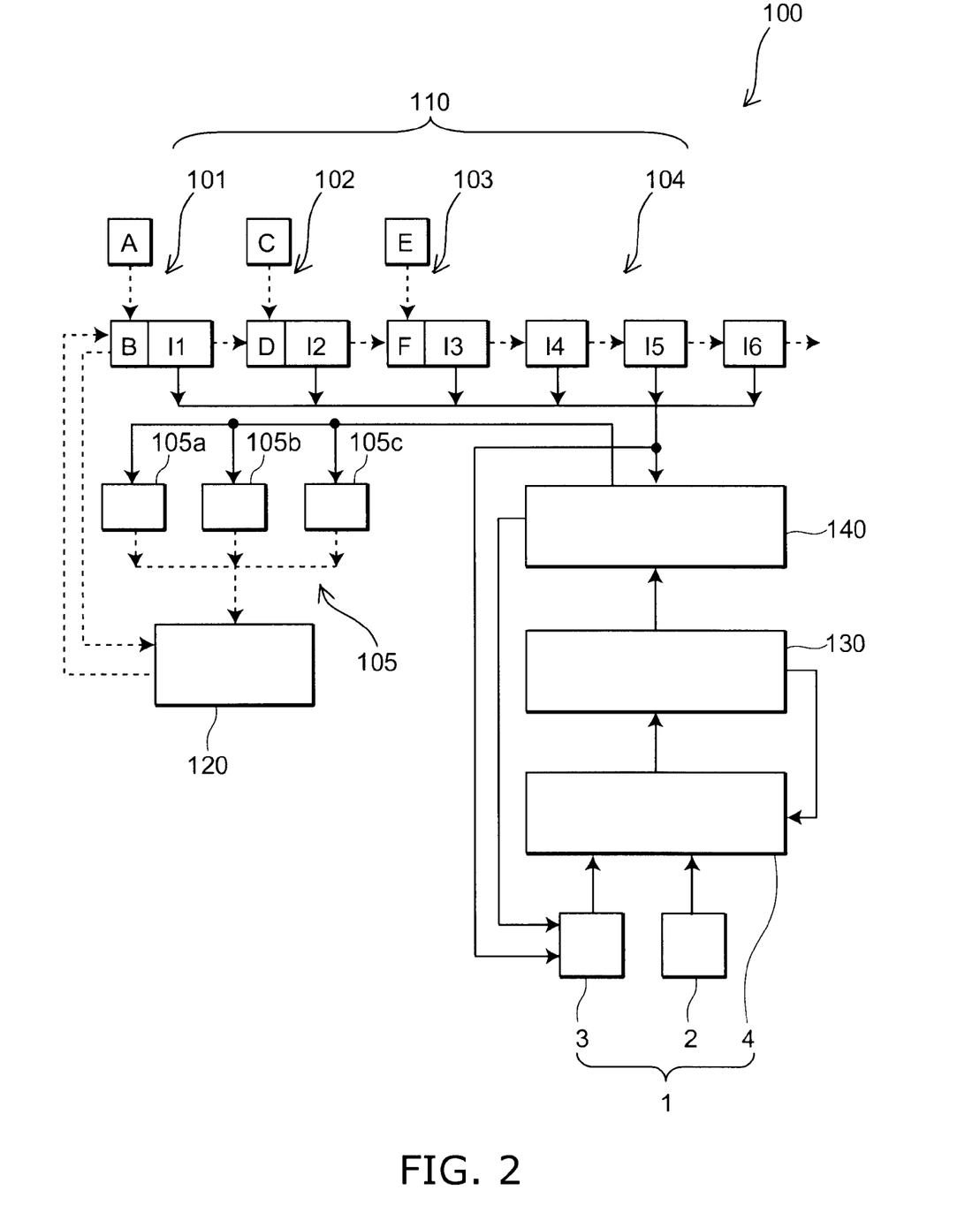
FIG. 2 is a block diagram for illustrating the schematic configuration of a manufacturing system.

FIG. 2 is a block diagram for illustrating the schematic configuration of a manufacturing system 100.

In the figure, the solid-line arrow represents data flow, and the dashed-line arrow represents flow of components and the like, or an operation for disassembly and removal.

The product manufacturing system 100 comprises a manufacturing line 110, a removal line 120, a removal part 105, a repair condition storage part 130, a repair condition selection part 140, and a repair support system 1. The manufacturing line 110 comprises a first assembly/inspection process 101, a second assembly/inspection process 102, a third assembly/inspection process 103, and a product inspection process 104. In the first assembly/inspection process 101, a component A is assembled with a component B, and inspection I1 thereof is performed. In the second assembly/inspection process 102, a component C is assembled with a unit D composed of the component A and the component B, and inspection I2 thereof is performed. In the third assembly/inspection process 103, a component E is assembled with a unit F composed of the unit D and the component C, and inspection I3 thereof is performed. In the product inspection process 104, various inspections I4 to I6 are performed on a product composed of the unit F and the component E. The product accepted in the inspection I6 of the product inspection process 104 is shipped as an accepted product. On the other hand, the product rejected in the inspections I1 to I6 of the first assembly/inspection process 101, the second assembly/inspection process 102, the third assembly/inspection process 103, and the product inspection process 104 is sent to the removal line 120.

Assembly in the manufacturing line 110 can illustratively be assembly of an electric machine in which motors, sensors, recording media, capacitors, and other electric components, circuit boards, semiconductor devices, and batteries are assembled in a frame or a unit. The post-assembly inspections I1 to I3 can illustratively be post-assembly inspection of electrical characteristics, inspection of the number of revolutions and the runout, dimensional inspection, dust inspection, inspection of bonding strength, and leakage inspection.

The product inspection process 104 (inspections I4 to I6) in the manufacturing line 110 can illustratively be the aging inspection for inspecting the presence of abnormality and the product specifications by actually operating the product, the environment resistance inspection such as temperature cycle inspection, the appearance inspection for inspecting the outer diameter dimension and flaws of the product, the inspection of weight and strength of the product, and breakdown voltage inspection.

It is noted that these components, units, and inspection contents are not limitative, but they can be suitably adapted to the intended product.

The units and products sent to the removal line 120 are processed by the removal part 105 to remove the rejected portions and subsequently returned to the associated process of the manufacturing line 110. Then assembly and inspection of components are performed again. Here, if the repair condition selection part 140 selects reinspection in the product inspection process 104, they are returned to the product inspection process 104 without the removal.

The removal part 105 can illustratively be a partial removal part 105a, a removal-by-process part 105b, and a full removal part 105c. The partial removal part 105a can illustratively be a robot equipped with tools such as an electric screwdriver and a soldering iron for disassembling and removing rejected components and units. The removed components and units can be discarded, or can be recycled and reused.

The removal-by-process part 105b can illustratively be a part operable to delete initial data written in a recording medium, to perform surface treatment and paint removal, and to remove a chemical layer by neutralization and washing. For instance, it can be a robot equipped with a part for deleting magnetic data and a part for spraying chemicals and wash water.

The full removal part 105c is intended for disassembling and removing all the components and units in a product. Like the partial removal part 105a, the full removal part 105c can illustratively be a robot equipped with tools such as an electric screwdriver and a soldering iron. The frame or base plate remaining after disassembling and removing all the components and units in a product is returned to the first process of the manufacturing line 110.

It is noted that the number and content of these part are not limitative, but they can be suitably adapted to disassembly and removal of the intended components and units.

The repair condition storage part 130 stores repair condition data and provides the repair condition data to the repair condition optimization part 4 and the repair condition selection part 140. The repair condition data provided to the repair condition optimization part 4 is subjected to the appropriateness determination. When the repair condition data has been modified by optimization, the repair condition storage part 130 stores the modified new data to update its data. It is noted that modification of the repair condition data includes addition of new repair conditions.

The repair condition selection part 140 is connected to the repair condition storage part 130. On the basis of the repair condition data provided from the repair condition storage part 130 and the inspection data incoming from each manufacturing process, the repair condition selection part 140 selects a repair condition (for instance, a repair method and an identified repair site) and provides an instruction of the selected repair condition to the removal part 105. At this time, the selected repair condition is sent as repair history data to the repair information storage part 3 and stored therein.

On the basis of this repair condition instruction, the intended product is repaired (rejected portions are removed, and the removed portions are recycled), and the inspection data in each process performed after the repair is sent to the repair condition selection part 140. This inspection data is sent also to the repair information storage part 3 and stored therein as repair information.

As described above, the repair support system 1 optimizes the data of the repair condition or the selection of the repair condition. Hence repair can be always done in the optimum repair condition. Consequently, occurrence of rejected products can be prevented, and there is no danger of repeating fruitless repair operations that do not result in an accepted (conforming) product.

Next, the operation of the manufacturing system 100 including the repair support system 1 is described.

First, in the first assembly/inspection process 101, a component A is assembled with a component B, and inspection thereof is performed. For instance, a plurality of electric components are mounted on a base plate, and inspection of electrical characteristics is performed.

In the inspection I1, the accepted product (of which repair is deemed unnecessary) is sent to the second assembly/inspection process 102, and the rejected product (of which repair is deemed necessary) is sent to the removal line 120. The collected inspection data is sent to the repair condition selection part 140 and the repair information storage part 3.

In the repair condition selection part 140, a repair condition is selected on the basis of the inspection data from the inspection I1, and an instruction of the selected repair condition is provided to the removal part 105. On the other hand, the data of the selected repair condition is sent also to the repair information storage part 3 and stored therein as repair information.

The removal part 105 performs an operation of disassembly and removal on the basis of the selected repair condition.

Also in the second assembly/inspection process 102 and the third assembly/inspection process 103, assembly and inspection are performed. The accepted product (of which repair is deemed unnecessary) is sent to the next process, and the rejected product (of which repair is deemed necessary) is sent to the removal line 120. Selection of the repair condition and the sending/receiving of data are similar to those in the first assembly/inspection process 101, and hence the description thereof is omitted.

Likewise, in the product inspection process 104, aging inspection is illustratively performed in the inspection I4. The accepted product (of which repair is deemed unnecessary) is sent to the inspection I5, and the rejected product (of which repair is deemed necessary) is sent to the removal line 120. The collected inspection data is sent to the repair condition selection part 140 and the repair information storage part 3.

In the repair condition selection part 140, a repair condition is selected on the basis of the inspection data from the inspection I4, and an instruction of the selected repair condition is provided to the removal part 105. On the other hand, the data of the selected repair condition is sent also to the repair information storage part 3 and stored therein as repair information.

The removal part 105 performs an operation of disassembly and removal on the basis of the selected repair condition. However, if reinspection is selected as the repair condition, the product is returned to the inspection I4 without the operation of disassembly and removal. The inspections I5 and I6 are similar to the inspection I4, and hence the description thereof is omitted.

The product having been subjected to disassembly and removal in the removal line 120 is returned to the process prior to the associated process of the manufacturing line 110.

For instance, if the component C assembled in the second assembly/inspection process 102 is removed, the product is returned to the first assembly/inspection process 101. After it is sent to the second assembly/inspection process 102, assembly of the component C and the inspection I2 are performed again. Then the accepted product (of which repair is deemed unnecessary) is sent to the third assembly/inspection process 103, and the rejected product (of which repair is deemed necessary) is sent again to the removal line 120. At this time, as in the first iteration of the inspection, the inspection data collected in the inspection I2 is sent to the repair condition selection part 140 and the repair information storage part 3. On the other hand, the data of the selected repair condition is sent to the removal part 105 and the repair information storage part 3.

In this manner, repair and data collection/accumulation are performed until the product is finally accepted. The product that is not accepted after being repaired a prescribed number of times may be discarded.

Here, if the repair condition is not appropriate, there is a danger of failing to prevent occurrence of rejected products. Furthermore, if such repair is repeated, there is a danger of repeating fruitless repair operations that do not result in an accepted product.

As a result of investigations, the inventor has recognized that rejected products and fruitless repair operations can be reduced by determining appropriateness of the repair condition or its selection on the basis of the repair information and optimizing the repair condition or its selection in response to a determination of being inappropriate.

First, a method for determining appropriateness of the repair condition is described.

Figure 3A:
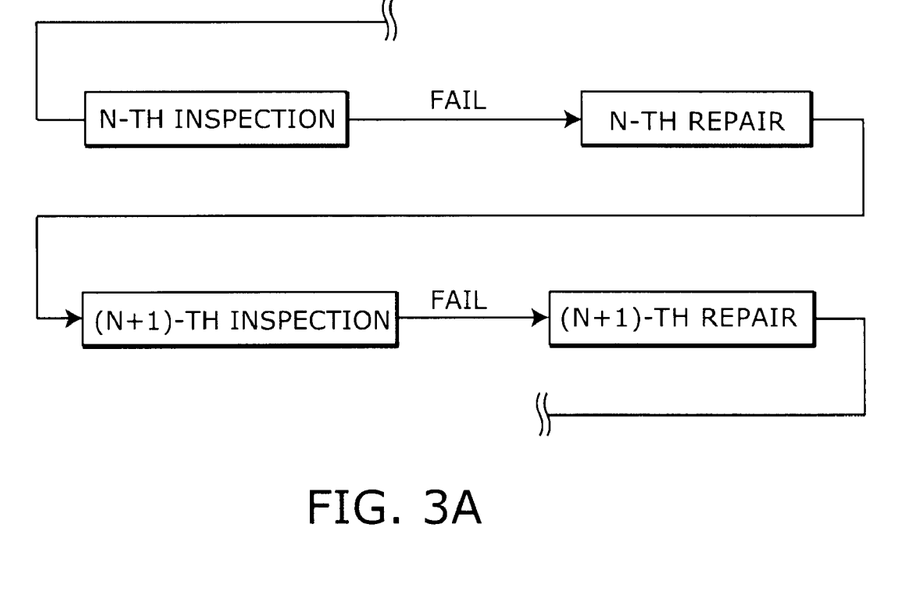
FIG. 3A is a schematic diagram for illustrating a method for determining appropriateness of the repair condition.
Figure 3B:
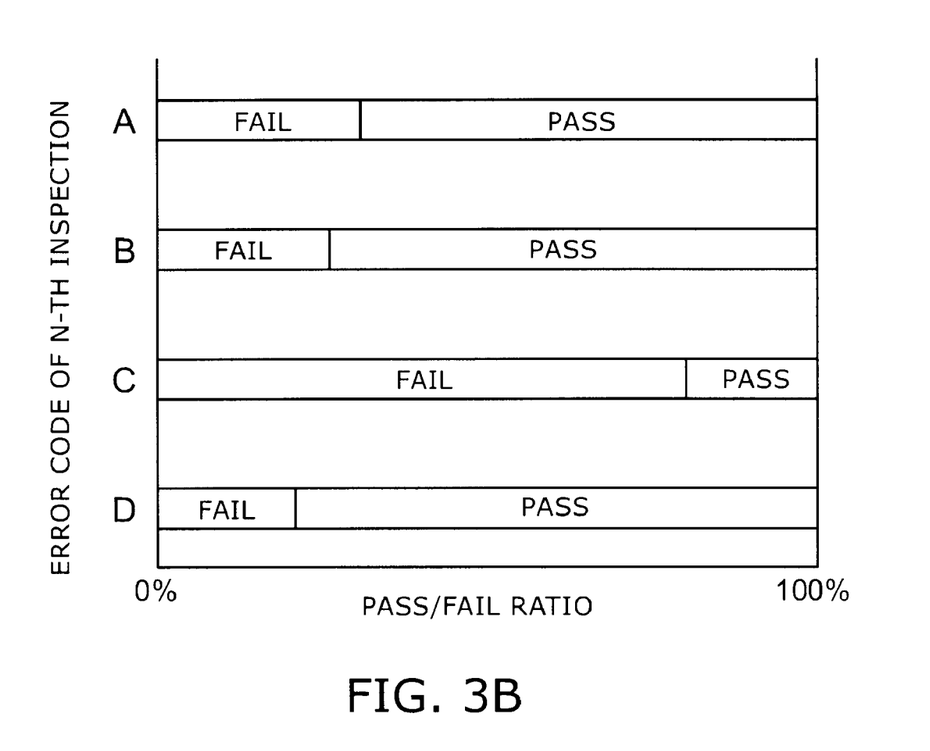
FIG. 3B is a schematic graph showing inspection results in the (N+1)-th inspection.

FIGS. 3A and 3B are schematic views for illustrating a method for determining appropriateness of the repair condition.

As shown in FIG. 3A, the product rejected in the N-th inspection is subjected to disassembly and removal in the removal line 120 and to the N-th repair in the manufacturing line 110. After the repair, the product is subjected to the (N+1)-th inspection, and the product rejected therein is subjected to the (N+1)-th repair.

FIG. 3B is a schematic graph showing inspection results in the (N+1)-th inspection. The vertical axis represents the error code in the N-th inspection, and the horizontal axis represents the pass/fail ratio (acceptance/rejection ratio). Here, a plurality of error codes are provided in one inspection. This is because in the case of electrical characteristics inspection, for instance, including such items as frequency characteristics, voltage characteristics, and current characteristics, an error code is assigned to each of them.

As shown in FIG. 3B, if the repair condition for a specific error code (error code C) is inappropriate, the pass rate for the error code is lower than for the other error codes. Hence, by using a suitable threshold, for instance, appropriateness of the repair condition for the error code can be determined from repair information data. Here, an inappropriate repair condition occurs when the content itself of the repair condition is inappropriate and when selection of the repair condition is inappropriate although there is no problem in the content of the repair condition.

Appropriateness of the repair condition can be determined also by considering the number of rejected products in the previous inspection (N-th inspection). For instance, if the number of rejected products for the error code C in the previous inspection (N-th inspection) is extremely smaller than those for the other error codes, it may be impossible to determine appropriateness of the repair condition simply from the ratio because of the small population. In this case, it is preferable to optimize the appropriateness determination by providing a threshold also to the number of rejections in the previous inspection (N-th inspection).

Figure 4A:
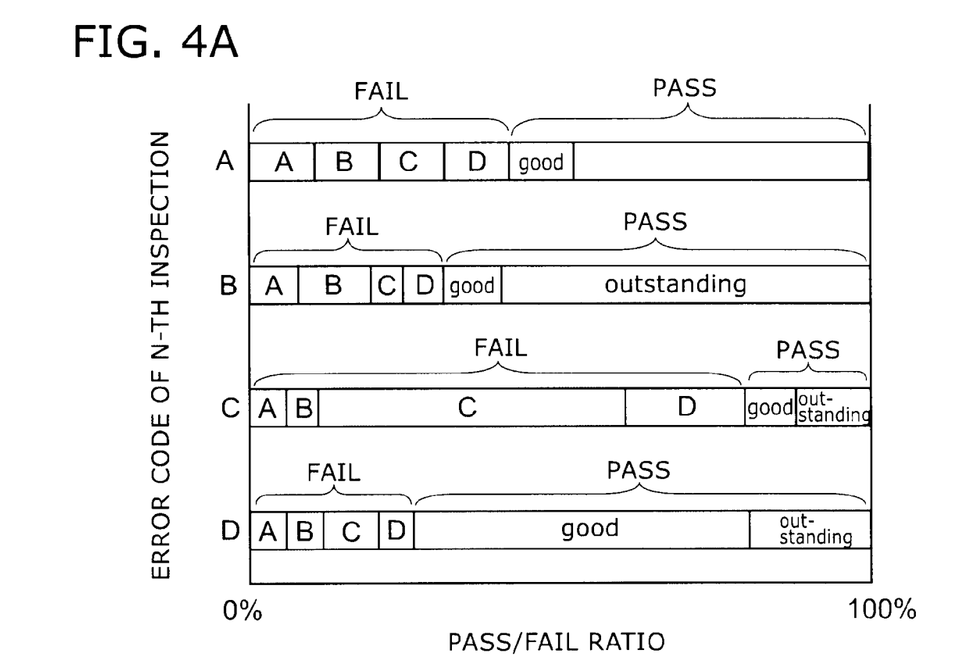
FIG. 4A is a schematic diagram for illustrating a method for improving accuracy in determination of appropriateness of the repair condition, and the breakdown of the rejection content in the (N+1)-th inspection is analyzed using the error code in that case.
Figure 4B:
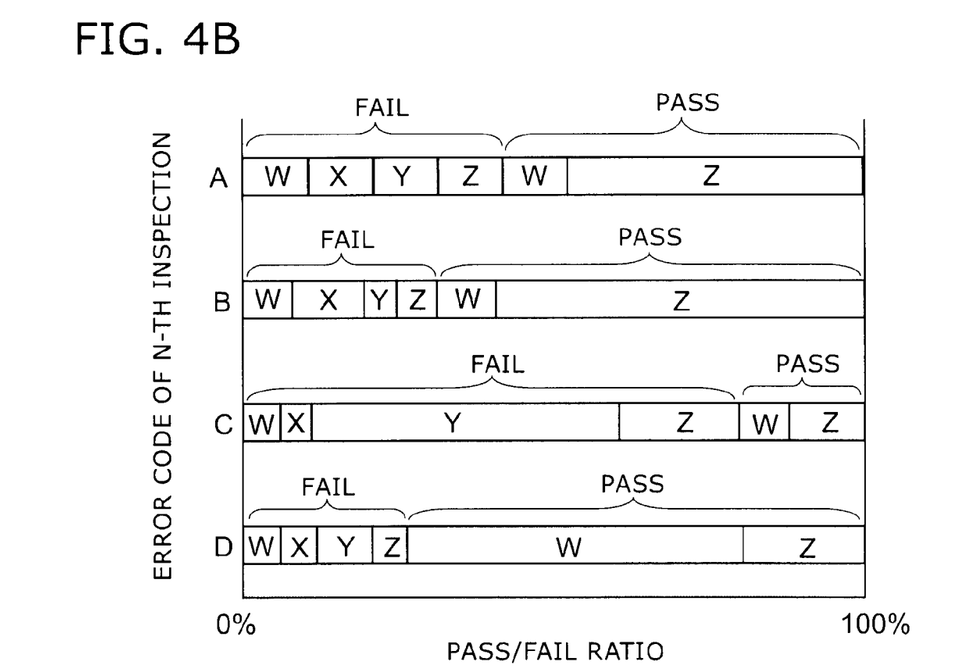
FIG. 4B is a schematic diagram for illustrating a method for improving accuracy in determination of appropriateness of the repair condition, and the breakdown of the rejection content in the (N+1)-th inspection is analyzed using the code of the N-th repair content.

FIGS. 4A and 4B are schematic views for illustrating a method for improving accuracy in determination of appropriateness of the repair condition. It is noted that, as with the case of FIG. 3B, the vertical axis represents the error code in the N-th inspection, and the horizontal axis represents the pass/fail ratio (acceptance/rejection ratio).

In the example shown in FIGS. 4A and 4B, contents of inspection results of the schematic view shown in FIG. 3B are further analyzed to improve the accuracy in the determination of appropriateness of the repair condition. In other words, analyzing not only the pass/fail ratio but also its breakdown improves the accuracy in the determination of appropriateness of the repair condition.

In the example shown in FIG. 4A, the breakdown of the rejection content in the (N+1)-th inspection shown in FIG. 3A is analyzed using the error code in that case. For instance, the product rejected by the error code C ("C" in the vertical axis) in the N-th inspection is subjected to the N-th repair, and the breakdown of the product rejected in the (N+1)-th inspection for repaired products is analyzed using error codes A, B, C, D in that case. In this case, in the error code C ("C" in the vertical axis) the ratio of rejected ones is high and the ratio of products re-rejected by the same error code C as the previous inspection is high. Hence, it is possible to determine the repair condition in the N-th repair to be inappropriate. Similarly in the error code B ("B" in the vertical axis) the ratio of rejected ones is low, but the ratio of products re-rejected by the same error code B as the previous inspection is slightly high. Also in such a case, an occurrence rate of nonconforming can be suppressed by readjusting the N-th repair condition.

According to this embodiment, the product rejected by the same error code as the previous inspection can be clarified, so it is possible to determine appropriateness of the previous repair condition more specifically. Hence, the accuracy in determination of the previous repair condition can be more improved. Furthermore, the occurrence of rejected products can be suppressed and fruitless repair operations that do not result in the accepted (conforming) product can be reduced.

Moreover, also in a case where the (N+1)-th inspection results in an acceptance, a further analysis can be performed according to a performance level or the like. For instance, it can be decided that a product satisfying the product specifications in a test of "response speed" and having a high response speed is as "outstanding (first-rate)", and a product having a slightly decreased response speed is as "good (second-rate)" or the like. As is the case of the error code D ("D" in the vertical axis), the repair condition can be readjusted for products having a high ratio of "good (second-rate)" with a high pass rate. Hence, the accuracy in the determination of appropriateness of the repair condition can be improved for the conforming, too.

In the example shown in FIG. 4B, the breakdown of the rejection content in the (N+1)-th inspection shown in FIG. 3A is analyzed using codes of the N-th repair content.

For instance, the product rejected by the error code C ("C" in the vertical axis) in the N-th inspection is subjected to the N-th repair, and the breakdown of the product rejected in the (N+1)-th inspection for the repaired product is analyzed using codes W, X, Y, Z of the N-th repair content. In this case, in the error code C ("C" in the vertical axis), the ratio of rejected ones is high and the ratio of products re-rejected by the code Y of the repair content is high. Hence, it is possible to determine the repair condition in the N-th repair (code Y of repair content) to be inappropriate directly. Similarly in the error code B ("B" in the vertical axis) the ratio of rejected ones is low, but the ratio of products re-rejected by the code X of the repair content is slightly high. Also in such a case, the occurrence rate of the nonconforming can be suppressed by readjusting the N-th repair condition (code X of repair content).

According to this embodiment, the repair condition resulting in re-rejection can be clarified directly, so it is possible to determine appropriateness of the previous repair condition more specifically. Hence, the accuracy in the determination of the previous repair condition can be more improved. Furthermore, the occurrence of rejected products can be suppressed and fruitless repair operations that do not result in the accepted (conforming) product can be reduced.

Moreover, also in a case where the (N+1)-th inspection results in the acceptance, a further analysis of the breakdown can be performed using the codes W, X, Y, Z of the repair content in the N-th repair. In this case, it is possible to determine the selection of the repair content (the code W) to be appropriate on products having a high pass rate with a high ratio of the code W of the repair content, as is the case of the error code D ("D" in the vertical axis). Hence, the accuracy in the determination of appropriateness of the repair condition can be improved for the conforming, too. It is noted that as with the case shown in FIG. 4A the analysis may be performed according to the performance level or the like.

Furthermore, the appropriateness of the repair condition can be determined using both results in FIG. 4A and FIG. 4B.

In this case, generally the group number of the repair contents (type of code) is larger than the group number of error codes (type of code). Hence, the method described in FIG. 4A is preferred for a more detailed analysis. On the other hand, the method described in FIG. 4B allows the determination of appropriateness of the repair condition more directly.

Hence, using both methods and utilizing each feature result in the possible determination of appropriateness of the detailed repair condition.

For instance, in "C" in the vertical axis in FIG. 4B, it is possible to grasp inappropriateness of the N-th repair condition (code Y of repair content) directly.

On the other hand, in the error code D ("D" in the vertical axis) in FIG. 4B, it is possible to determine that the repair on the code W of the repair content is appropriate, but it can be grasped that the ratio of "good (second-rate)" is high by referring to FIG. 4A, too. Hence, when an increase of the ratio of "outstanding (first-rate)" is needed, it is possible to know that readjusting the repair content based on the code W which is determined to be appropriate in FIG. 4B is necessary.

Figure 5A:
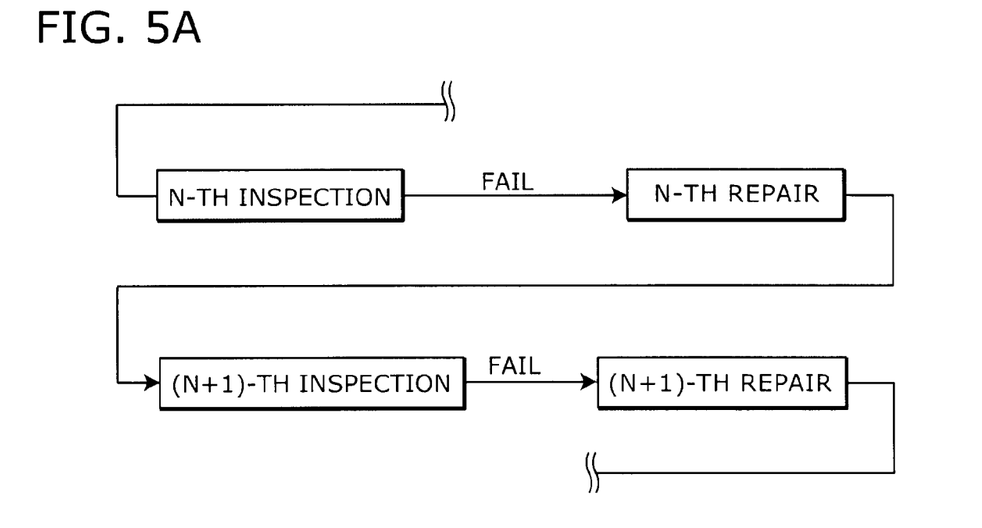
FIG. 5A is a schematic diagram for illustrating another method for determining appropriateness of the repair condition.
Figure 5B:
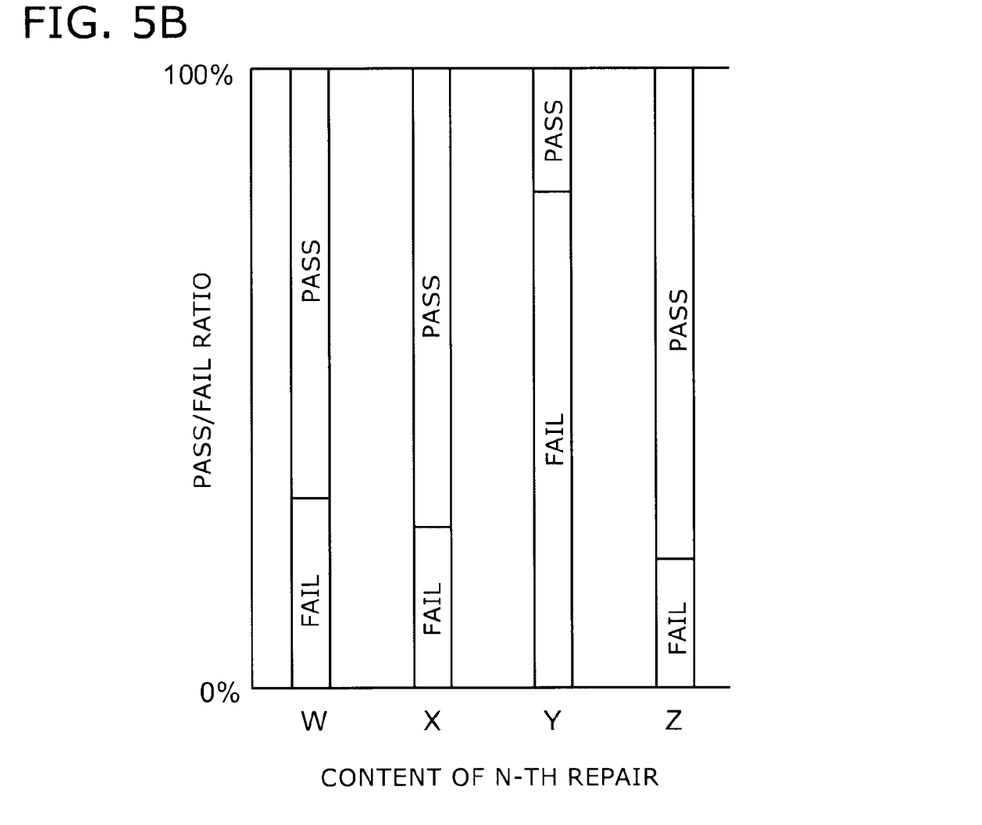
FIG. 5B is a schematic graph showing inspection results in the (N+1)-th inspection.

FIGS. 5A and 5B are schematic views for illustrating another method for determining appropriateness of the repair condition.

FIG. 5A is the same as FIG. 3A, and hence the description thereof is omitted.

FIG. 5B is a schematic graph showing inspection results in the (N+1)-th inspection. The vertical axis represents the pass/fail ratio (acceptance/rejection ratio), and the horizontal axis represents the content of the N-th repair. Here, a plurality of repair contents are provided in one inspection. This is because in the case of electrical characteristics inspection, for instance, including such items as frequency characteristics, voltage characteristics, and current characteristics, a repair content is required for each of them.

As shown in FIG. 5B, if the repair condition for a specific repair content (repair content Y) is inappropriate, the pass rate for the repair content is lower than for the other repair contents. Hence, by using a suitable threshold, for instance, appropriateness of the repair condition for the repair content can be determined from repair information data. Here, an inappropriate repair condition occurs when the content itself of the repair condition is inappropriate and when selection of the repair condition is inappropriate although there is no problem in the content of the repair condition.

Appropriateness of the repair condition can be determined also by considering the number of rejected products in the previous inspection (N-th inspection). For instance, if the number of rejected products for the repair content Y in the previous inspection (N-th inspection) is extremely smaller than those for the other repair contents, it may be impossible to determine appropriateness of the repair condition simply from the ratio because of the small population. In this case, it is preferable to optimize the appropriateness determination by providing a threshold also to the number of rejections in the previous inspection (N-th inspection).

Figure 6A:
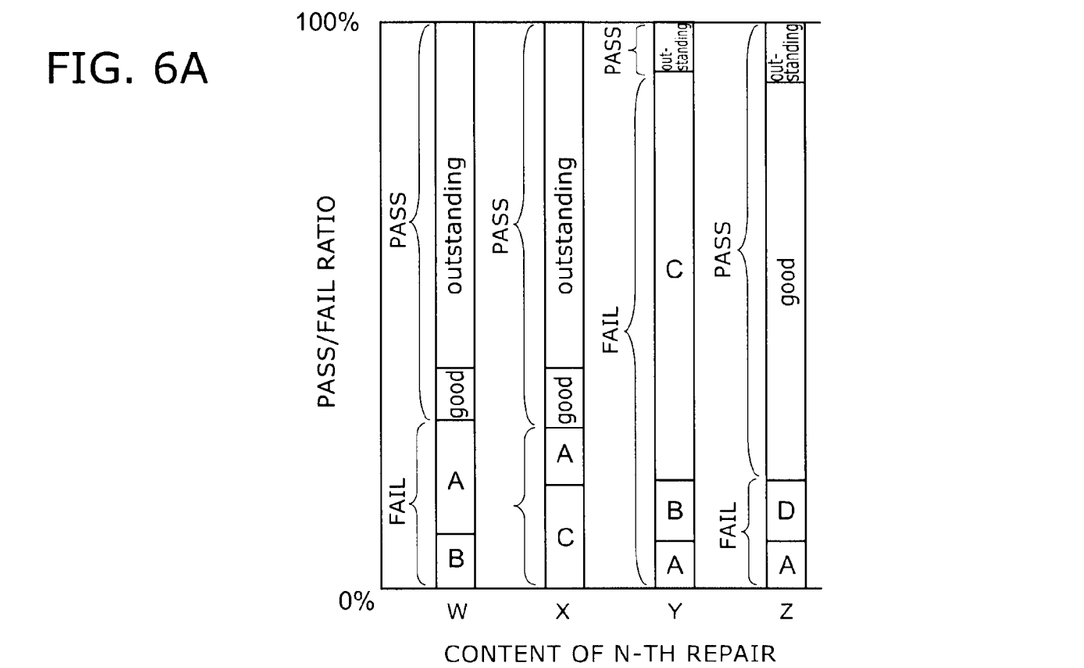
FIG. 6A is a schematic diagram for illustrating a method for improving accuracy in determination of appropriateness of the repair condition and the breakdown of the rejection content in the (N+1)-th inspection is analyzed using the error code in that case.
Figure 6B:
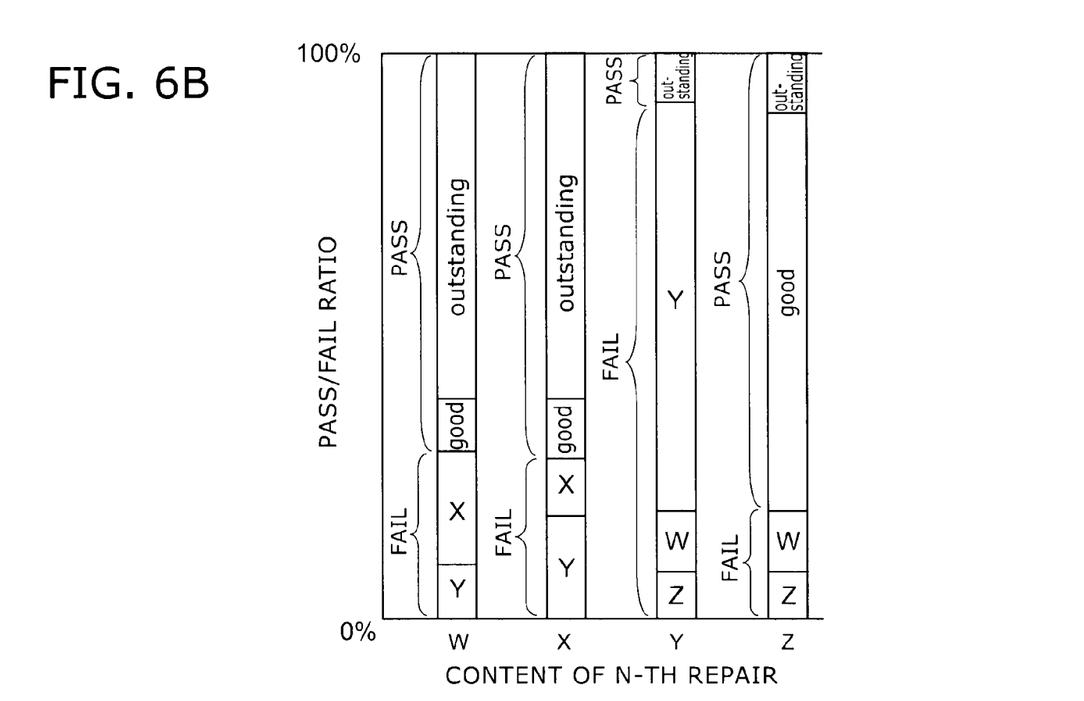
FIG. 6B is a schematic diagram for illustrating a method for improving accuracy in determination of appropriateness of the repair condition, and the breakdown of the rejection content in the (N+1)-th inspection is analyzed using the code of the N-th repair content.

FIGS. 6A and 6B are schematic diagrams for illustrating a method for improving accuracy in the determination of appropriateness of the repair condition. It is noted that, as with FIG. 5B, the vertical axis represents the pass/fail ratio (acceptance/rejection ratio), and the horizontal axis represents the N-th repair content.

In the example shown in FIGS. 6A and 6B, contents of inspection results of the schematic view shown in FIG. 5B are further analyzed to improve the accuracy in the determination of appropriateness of the repair condition. In other words, analyzing not only the pass/fail ratio but also its breakdown improves the accuracy in the determination of appropriateness of the repair condition.

In the example shown in FIG. 6A, the breakdown of the rejection content in the (N+1)-th inspection shown in FIG. 5A is analyzed using the error code in that case. For instance, the product which the repair content in the N-th repair is the code Y ("Y" in the horizontal axis) is subjected to the (N+1)-th inspection and the breakdown of the product rejected in the (N+1)-th inspection is analyzed using error codes A, B, C, D in that case. In this case, in the code Y ("Y" in the horizontal axis) the ratio of rejected ones is high and the ratio of products rejected by the error code C is high. Hence, it is possible to determine the repair condition in the N-th repair (repair of code Y) to be inappropriate. Similarly in the code W ("W" in the horizontal axis) the ratio of rejected ones is low, but the ratio of products rejected by the error code A is slightly high. Also in such a case, the occurrence rate of the nonconforming can be suppressed by readjusting the N-th repair condition (repair of code W).

According to this embodiment, the repair condition resulting in re-rejection can be clarified, so it is possible to determine appropriateness of the previous repair condition more specifically. For instance, it is seen that a probability of rejection by the code C is high in spite of the repair of the code Y and a probability of acceptance is low in spite of the same repair (repair of code Y). Hence, the accuracy in the determination of the previous repair condition can be more improved. Furthermore, the occurrence of rejected products can be suppressed and fruitless repair operations that do not result in the accepted (conforming) product can be reduced.

Moreover, also in a case where the (N+1)-th inspection results in the acceptance, a further analysis can be performed according to the performance level or the like. For instance, it can be decided that a product satisfying the product specifications in a test of "response speed" and having a high response speed is as "outstanding (first-rate)", and a product having a slightly decreased response speed is as "good (second-rate)" or the like. As is the case of the code Z ("Z" in the horizontal axis), the repair condition can be readjusted for products having a high ratio of "good (second-rate)" with a high pass rate. Hence, the accuracy in the determination of appropriateness of the repair condition can be improved for the conforming, too.

In the example shown in FIG. 6B, the breakdown of the rejection content in the (N+1)-th inspection shown in FIG. 5A is analyzed using the codes of the (N+1)-th repair content. For instance, the product rejected in the N-th inspection is subjected to the N-th repair, and the breakdown of the product rejected in the (N+1)-th inspection for the repaired product is analyzed using codes W, X, Y, Z of the (N+1)-th repair content. In this case, in the code Y ("Y" in the horizontal axis) the ratio of rejected ones is high and the ratio of products re-rejected by the code Y of the same repair content is high. Hence, it is possible to determine the N-th repair condition (code Y of the repair content) to be inappropriate directly. Similarly in the code W ("W" in the horizontal axis) the ratio of rejected ones is low, but the ratio of products re-rejected by the code X of the repair condition is slightly high. Also in such a case, the occurrence rate of the nonconforming can be suppressed by readjusting the N-th repair condition (code X of repair content).

According to this embodiment, the repair condition resulting in re-rejection can be clarified, so it is possible to determine appropriateness of the previous repair condition more specifically. Hence, the accuracy in the determination of the previous repair condition can be more improved. Furthermore, the occurrence of rejected products can be suppressed and fruitless repair operations that do not result in the accepted (conforming) product can be reduced.

Moreover, also in a case where the (N+1)-th inspection results in the acceptance, a further analysis can be performed according to the performance level or the like. It is noted that, this case is the same as described in FIG. 6A and not described in detail.

Furthermore, appropriateness of the repair condition can be determined using both results in FIG. 6A and FIG. 6B.

In this case, generally the group number of the repair contents (type of code) is larger than the group number of error codes (type of code). Hence, the method described in FIG. 6A is preferred for a more detailed analysis. On the other hand, the method described in FIG. 6B allows the determination of appropriateness of the repair condition more directly.

Hence, using both methods and utilizing each feature result in the possible determination of appropriateness of the more detailed repair condition.

For instance, in the code Y ("Y" in the horizontal axis) in FIG. 6B, it is possible to grasp inappropriateness of the N-th repair condition (code Y of repair content) directly.

The determination of appropriateness of the repair condition can be made on the basis of one of the determination methods described with reference to FIGS. 3 to 6. However, a more correct determination can be made by combining a plurality of determination methods. For instance, the determination method described with reference to FIGS. 3A, 3B, 4A and 4B can be used to determine appropriateness of the repair condition for the selection of the error code, and the determination method described with reference to FIGS. 5A, 5B, 6A and 6B can be used to determine appropriateness of the repair condition for the selection of the repair content. Hence, a more correct determination can be made by considering those in combination.

It is noted that the determination methods described with reference to FIGS. 3 to 6 are not limitative, but any determination method can be suitably configured by combining items and data related to inspection and repair.

Next, returning to FIG. 1, optimization of the repair condition determined inappropriate is described.

In the repair condition optimization part 4, if a repair condition is determined inappropriate by the determination method described with reference to FIGS. 3 to 6, it is optimized.

In an example optimization method, the repair condition can be optimized by using a computing part to perform statistical processing on the repair information such as past repair data stored in the repair information storage part 3.

The repair condition can be also optimized on the basis of reference information stored in the reference information storage part 2. For instance, if it is determined that the number of rejected products is large for a specific manufacturer or lot, the repair condition can be optimized so as to exclude them. Furthermore, the repair condition can be optimized by inferring an appropriate repair condition on the analogy of the repair history of similar components and units. For instance, the repair condition can be optimized by encoding the reference information and suitably searching it using a search part. Furthermore, experiences of skilled repairers can be stored as reference information in the reference information storage part 2 and suitably searched using a search part.

The foregoing optimization methods can be automatically performed using a computing part.

When it is determined that the repair condition is inappropriate, a notification can be sent to the repairer so that the skilled repairer manually modifies the repair condition to an appropriate one with making reference to data stored in the reference information storage part 2 and the repair information storage part 3. Then the repair condition can be optimized also in consideration of empirical rules, which are difficult to treat as data.

As described earlier, in an example optimization method, optimization can be performed on the basis of one of the repair information and the reference information. However, by combining both in optimization, a more appropriate repair condition can be obtained and selected.

As described above, in the product manufacturing system 100 according to this embodiment, the data of the repair condition or the selection of the repair condition can be optimized by the operation of the repair support system 1. Hence repair can be always done in the optimum repair condition. Consequently, occurrence of repetitively rejected products can be prevented, and there is no danger of repeating fruitless repair operations that do not result in an accepted (conforming) product. Thus productivity and yield can be dramatically enhanced.

Next, another embodiment of the invention is described.

In the embodiment described above with reference to FIGS. 1 to 6, on the basis of the repair information of the intended product stored in the repair information storage part 3 such as repair history data of the intended product (for instance, the latest repair site and repair method, and past repair sites and repair methods) and inspection history data of the intended product, appropriateness of the repair condition or its selection is determined, and it is optimized.

In contrast, in this embodiment, on the basis of repair information related to the component of the intended product such as repair history data related to the component of the intended product (for instance, data of the latest replaced component and data of past replaced components) and inspection history data related to the component of the intended product, appropriateness of the repair condition or its selection is determined, and it is optimized. Thus appropriateness of the repair condition or its selection can be determined on the basis of component-level repair information, and hence a determination can be based on a clearer grasp of the cause of rejection.

For instance, as described with reference to FIG. 2, in the first assembly/inspection process 101, a component A is assembled with a component B, and inspection thereof is performed. Here, if the inspection result is rejection, it is not always clear what is the cause of the rejection. That is, in the case of this example, it is impossible to clearly grasp whether the cause of the rejection lies in the component A itself, in the component B itself, or in the combination of the component A and the component B.

Also in this case, according to this embodiment, the cause of rejection can be clearly grasped on the basis of component-level repair information, and hence appropriateness of the repair condition or its selection can be determined more accurately. This can be described as follows with reference to the above example. For instance, if the inspection items in the assembly/inspection process 101 include repair information specific to the component A (for instance, the inspection result for the output level or other characteristics of the component A), this repair information (the repair information specific to the component A) can be used to clearly grasp whether the cause of the rejection lies in the component A itself. Consequently, if the cause lies in the component A, it can be accurately determined that it is suitable to replace the component A and to perform inspection again. Furthermore, as described later, by compiling the component-level repair information, it can be clearly grasped whether the cause of the rejection lies in the component itself or in the combination of components.

Moreover, because the degree of defect existing in the component itself can be also grasped, it is also possible to accurately determine the reusability of the component, the need of repair, and the need of discarding the component. Hence wastefully discarded components can be decreased, and the production cost and the environmental load can be reduced.

Here, if appropriateness of the repair condition or its selection is determined on the basis of repair information related to the component of the intended product, a control number can be assigned to each component so that the repair information (repair history data, inspection history data, etc.) is stored in the repair information storage part 3 for each control number (for each component). Then, as described above with reference to FIGS. 1 to 6B, appropriateness of the repair condition or its selection can be determined on the basis of the repair information for each control number from the repair information storage part 3, and in response to a determination of being inappropriate, the data of the repair condition or the selection of the repair condition can be optimized on the basis of the repair information. Furthermore, the degree of defect can be also clarified. Hence, in the case where the cause of rejection lies in the component itself, if it is determined that the data of the repair condition or the selection of the repair condition does not need to be optimized, it is also possible to perform only replacement of the component and discarding of the replaced component without performing optimization. Moreover, if there are wide-ranging inspection items, for instance, it is also possible to optimize only part of them.

The method for optimizing the data of the repair condition or the selection of the repair condition on the basis of the component-related repair information can be performed like the above optimization based on the product repair information, and hence the description thereof is omitted.

As a result of further investigations, the inventor has recognized that the need to assign a control number to each component and to store it is eliminated by extracting repair information specific to the component included in each inspection, allowing reduction of the load on the repair information storage part 3 and also allowing the system to be downsized.

Furthermore, by extracting repair information specific to the component, it is possible to grasp the component-level repair information and the product repair information, and an accurate determination can be also made in accordance with the nature of the respective information.

For instance, in the case of the above example, if the cause of rejection lies in the component A itself, an accurate determination can be made by using the component-level repair information. However, if it is appropriate to simply perform reinspection without replacing the component A, the product repair information can be suitably used. In this case, for using only the product repair information, the component-level repair information is not needed and does not need to be constantly stored. Hence, by extracting the component-level repair information as needed, advantageously, the load on the repair information storage part 3 can be reduced, and the system can be downsized.

Figure 7:
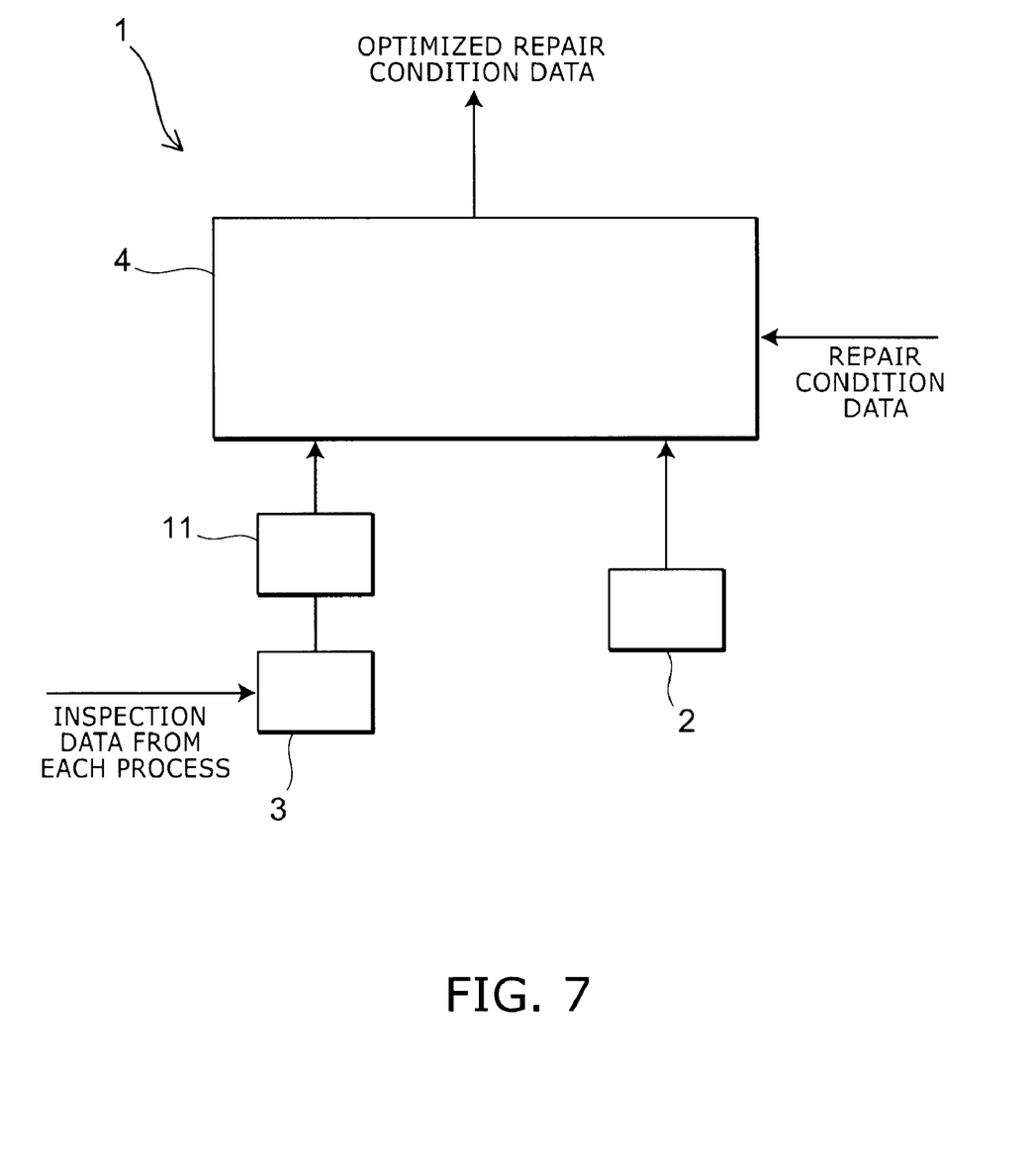
FIG. 7 is a block diagram for illustrating the schematic configuration of a product repair support system including a component repair information extraction part.

FIG. 7 is a block diagram for illustrating the schematic configuration of a product repair support system including a component repair information extraction part.

Here, the same elements as those described with reference to FIG. 1 are marked with like reference numerals, and the description thereof is omitted.

As shown in FIG. 7, the repair support system 10 comprises a reference information storage part 2, a repair information storage part 3, a repair condition optimization part 4, and a component repair information extraction part 11.

The component repair information extraction part 11 is connected between the repair information storage part 3 and the repair condition optimization part 4. The component repair information extraction part 11 extracts component-level repair information, compiles it if necessary, and provides it as repair information data to the repair condition optimization part 4. It is noted that, depending on the inspection result, the product repair information stored in the repair information storage part 3 can be directly sent to the repair condition optimization part 4 without extraction and compilation of component-related data.

Figure 8:
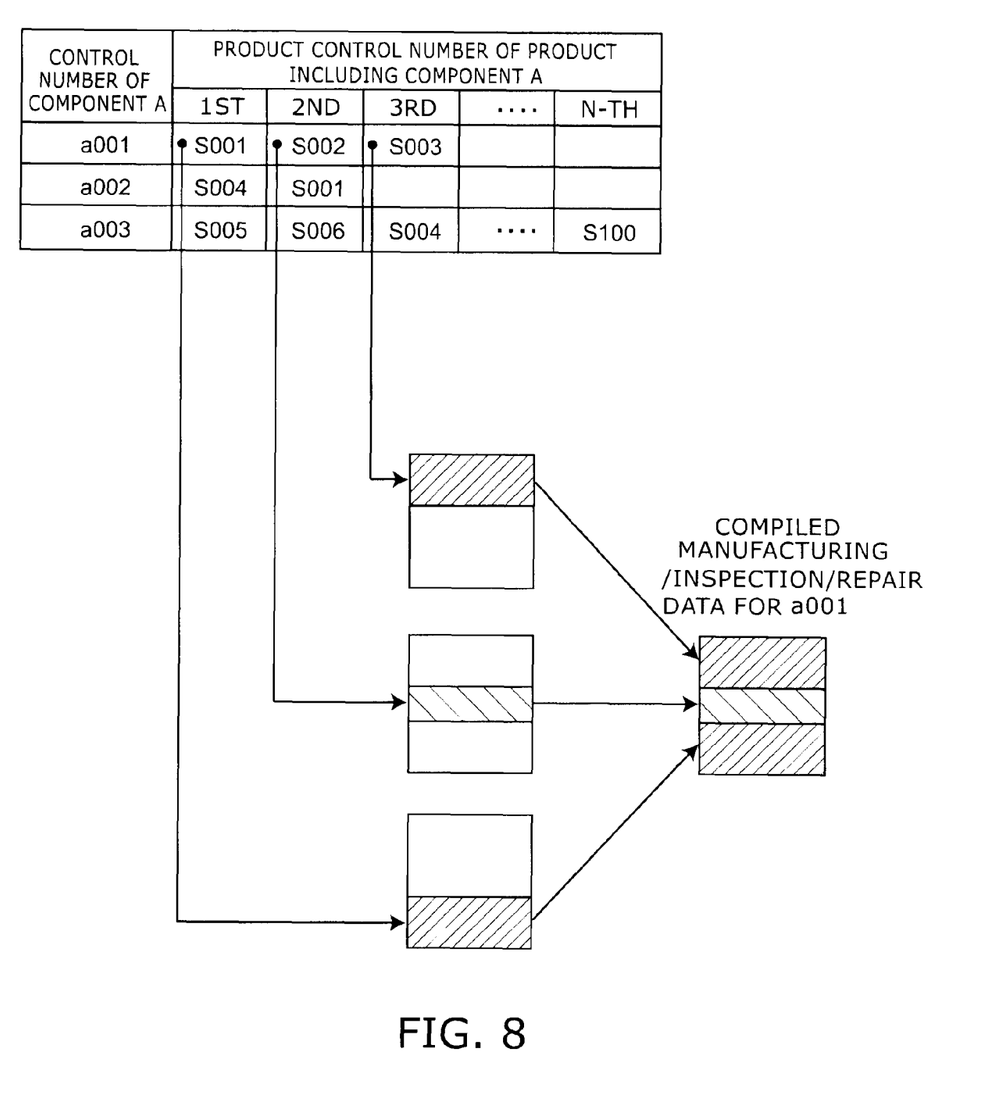
FIG. 8 is a schematic diagram for illustrating extraction and compilation of repair information.

FIG. 8 is a schematic diagram for illustrating extraction and compilation of repair information.

The table in the upper portion of FIG. 8 schematically shows storage of the data of components and the repair information of products including the components. The data is stored for each "control number of component A" and "product control number of product including component A". For convenience, a description is given of the component A, but this is not limitative. The invention is applicable to any component included in the product.

The "product control number of product including component A" represents the control number of the manufacturing/inspection/repair data of the product including a specific component A. By way of illustration, a product including a specific component A represented by one of the control numbers a001 to a003 is rejected in the inspection (first iteration); the specific component A is removed and reused for assembling another product, which is rejected in the inspection (second iteration); and the specific component A is removed and reused for assembling another product, which is rejected in the inspection (third iteration, and likewise, N-th iteration).

In such a case, the component repair information extraction part 11 first extracts only the data related to the intended specific component. For instance, as shown on the left side of the lower portion of the figure, it extracts only the manufacturing/inspection/repair data (first iteration: S001, second iteration: S002, third iteration: S003) related to the product including the component A identified by the control number a001. These are compiled into one manufacturing/inspection/repair data as shown on the right side of the lower portion of the figure. That is, by using the component repair information extraction part 11, repair information related to a specific component A is extracted and collectively compiled.

In such techniques as disclosed in Patent Document 1, the manufacturing/inspection/repair data is controlled on a product-by-product basis. For instance, the data is controlled in such a manner as data for the product control number S001, data for the product control number S002, and so forth.

However, if it is desirable to improve the repair content for a trouble closely related to a specific component, the cause of the trouble attributed to the specific component can be clarified by making reference to the data compiled for each specific component than by making reference to the data compiled for each product.

That is, in such a case, if the data controlled on a product-by-product basis is compiled into component-by-component data, then unnecessary data is not mixed, and hence the data accuracy can be improved. Consequently, the level of cause identification and situation analysis can be improved. Furthermore, the efficiency of data processing can be enhanced, and the system load can be reduced.

It is noted that data compilation can be performed individually as needed. Alternatively, the data can be sequentially compiled in advance for all the components and stored in a memory part.

Depending on the content or result of the inspection, the extracted manufacturing/inspection/repair data can be used individually without compilation. Furthermore, as described above, if it is appropriate to simply perform reinspection without replacing the component A, the product repair information can be suitably used. Hence the product repair information stored in the repair information storage part 3 can be directly sent to the repair condition optimization part 4 without extraction or compilation of data related to the component A.

The method for optimizing the data of the repair condition or the selection of the repair condition on the basis of the extracted or compiled data related to the component can be performed like the above optimization based on the product repair information, and hence the description thereof is omitted.

A product manufacturing system including the repair support system 10 can be realized by substituting the repair support system 10 for the repair support system 1 of the manufacturing system 100 described with reference to FIG. 2, and the configuration can be similar for the elements other than the repair support system 10. Hence the description thereof is omitted.

The embodiments of the invention have been described with reference to examples. However, the invention is not limited to these examples.

The above examples can be suitably modified by those skilled in the art, and such modifications are also encompassed within the scope of the invention as long as they include the features of the invention.

For instance, the shape, dimension, material, arrangement, and number of elements included in the repair support system 1, the repair support system 10, and the manufacturing system 100, the content of the repair method, the product to be repaired, and the content of the data are not limited to those illustrated, but can be suitably modified.

The elements included in the above examples can be combined with each other as long as feasible, and such combinations are also encompassed within the scope of the invention as long as they include the features of the invention.

The invention claimed is:

1. A product repair support system configured to support repair of a product rejected in an inspection based on a prescribed inspection standard, the product repair support system comprising:
a repair information storage part configured to store a result of the inspection of the repaired product as repair information;
a reference information storage part configured to store reference information related to the product;
a component repair information extraction part configured to extract a component-level repair information from the repair information stored in the repair information storage part, the component-level repair information being obtained by reusing the component in the product, and standards for reuse of the component being created by using the component-level repair information; and
a repair condition optimization part configured to determine appropriateness of a repair condition or selection of the repair condition on basis of the component-level repair information and, in response to a determination of being inappropriate, to optimize data of the repair condition or the selection on basis of at least one of the repair information, the reference information, and the component-level repair information,
wherein the optimization includes at least one of the following:
searching the reference information for information related to the repair condition or the selection determined inappropriate, and modifying data content of the repair condition or the selection by inferring an appropriate repair condition from repair history of similar components and units,
modifying data content of the repair condition or the selection on basis of a pass/fail ratio for each error code of the inspection in the repair information or the component-level repair information, and
modifying data content of the repair condition or the selection on basis of a pass/fail ratio for each code of repair content of the inspection in the repair information or the component-level repair information.

2. The product repair support system according to claim 1, wherein the component repair information extraction part collectively compiles the component-level repair information.

3. The product repair support system according to claim 1, wherein rejection content in the inspection is analyzed for the each error code or for each code of the repair content.

4. The product repair support system according to claim 1, wherein acceptance content in the inspection is classified into a plurality of levels of quality.

5. A product repair support system configured to support repair of a product rejected in an inspection based on a prescribed inspection standard, the product repair support system comprising:

a repair information storage part configured to store a result of the inspection of the repaired product as a component-level repair information for each component, the component-level repair information being obtained by reusing the component in the product, and standards for reuse of the component being created by using the component-level repair information;

a reference information storage part configured to store reference information related to the product; and a repair condition optimization part configured to determine appropriateness of a repair condition or selection of the repair condition on basis of the component-level repair information and, in response to a determination of being inappropriate, to optimize data of the repair condition or the selection on basis of at least one of the component-level repair information and the reference information, wherein the optimization includes at least one of the following:
    searching the reference information for information related to the repair condition or the selection determined inappropriate, and modifying data content of the repair condition or the selection by inferring an appropriate repair condition from repair history of similar components and units,
    modifying data content of the repair condition or the selection on basis of a pass/fall ratio for each error code of the inspection in the repair information or the component-level repair information, and
    modifying data content of the repair condition or the selection on basis of a pass/fail ratio for each code of repair content of the inspection in the repair information or the component-level repair information.

6. The product repair support system according to claim 5, wherein rejection content in the inspection is analyzed for the each error code or for each code of the repair content.

7. The product repair support system according to claim 5, wherein acceptance content in the inspection is classified into plurality of levels of quality.

8. A product manufacturing system operable to perform assembly of an article, inspection based on a prescribed inspection standard after the assembly, and repair of a product rejected in the inspection, the product manufacturing system comprising:

a product repair support system configured to support repair of a product rejected in an inspection based on a prescribed inspection standard; and a removal part configured to remove a portion rejected in the inspection of the product, the product repair support system including:
    a repair information storage part configured to store a result of the inspection of the repaired product as repair information;
    a reference information storage part configured to store reference information related to the product;
    a component repair information extraction part configured to extract a component-level repair information from the repair information stored in the repair information storage part, the component-level repair information being obtained by reusing the component in the product, and standards for reuse of the component being created by using the component-level repair information; and
    a repair condition optimization part configured to determine appropriateness of a repair condition or selection of the repair condition on basis of the component-level repair information and, in response to a determination of being inappropriate, to optimize data of the repair condition or the selection on basis of at least one of the repair information, the reference information, and the component-level repair information, wherein the optimization includes at least one of the following:
    searching the reference information for information related to the repair condition or the selection determined inappropriate, and modifying data content of the repair condition or the selection by inferring an appropriate repair condition from repair history of similar components and units,
    modifying data content of the repair condition or the selection on basis of a pass/fail ratio for each error code of the inspection in the repair information or the component-level repair information, and
    modifying data content of the repair condition or the selection on basis of a pass/fail ratio for each code of repair content of the inspection in the repair information or the component-level repair information.

9. A product manufacturing system operable to perform assembly of an article, inspection based on a prescribed inspection standard after the assembly, and repair of a product rejected in the inspection, the product manufacturing system comprising:

a product repair support system configured to support repair of a product rejected in an inspection based on a prescribed inspection standard; and a removal part configured to remove a portion rejected in the inspection of the product, the product repair support system including:
    a repair information storage part configured to store a result of the inspection of the repaired product as a component-level repair information for each component, the component-level repair information being obtained by reusing the component in the product, and standards for reuse of the component being created by using the component-level repair information;
    a reference information storage part configured to store reference information related to the product; and
    a repair condition optimization part configured to determine appropriateness of a repair condition or selection of the repair condition on basis of the component-level repair information and, in response to a determination of being inappropriate, to optimize data of the repair condition or the selection on basis of at least one of the component-level repair information and the reference information, wherein the optimization includes at least one of the following:
    searching the reference information for information related to the repair condition or the selection determined inappropriate, and modifying data content of the repair condition or the selection by inferring an appropriate repair condition from repair history of similar components and units,
    modifying data content of the repair condition or the selection on basis of a pass/fail ratio for each error code of the inspection in the repair information or the component-level repair information, and
    modifying data content of the repair condition or the selection on basis of a pass/fail ratio for each code of repair content of the inspection in the repair information or the component-level repair information.

10. A product manufacturing method operable to perform assembly of an article, inspection based on a prescribed inspection standard after the assembly, and repair of a product rejected in the inspection, the product manufacturing method comprising:

performing the inspection on the repaired product and accumulating a result thereof as repair information;

extracting a component-level repair information from the repair information, the component-level repair information being obtained by reusing the component in the product;

creating standards for reuse of the component by using the component-level repair information; and     determining appropriateness of a repair condition or selection of the repair condition on basis of the component-level repair information and, in response to a determination of being inappropriate, optimizing data of the repair condition or the selection on basis of at least one of the repair information, reference information related to the product, and the component-related repair information; and     repairing the product on basis of the data of the repair condition or the selection of the repair condition being optimized,     wherein the optimizing includes at least one of the following:

searching the reference information for information related to the repair condition or the selection determined inappropriate, and modifying data content of the repair condition or the selection by inferring an appropriate repair condition from repair history of similar components and units,         modifying data content of the repair condition or the selection on basis of a pass/fail ratio for each error code of the inspection in the repair information or the component-level repair information, and         modifying data content of the repair condition or the selection on basis of a pass/fail ratio for each code of repair content of the inspection in the repair information or the component-level repair information.

11. A product manufacturing method operable to perform assembly of an article, inspection based on a prescribed inspection standard after the assembly, and repair of a product rejected in the inspection, the product manufacturing method comprising:

performing the inspection on the repaired product and accumulating a result thereof as a component-level repair information for each component, the component-level repair information being obtained by reusing the component in the product;

creating standards for reuse of the component by using the component-level repair information;

determining appropriateness of a repair condition or selection of the repair condition on basis of the component-level repair information and, in response to a determination of being inappropriate, optimizing data of the repair condition or the selection on basis of at least one of the component level repair information and reference information related to the product; and     repairing the product on basis of the data of the repair condition or the selection of the repair condition being optimized,     wherein the optimizing includes at least one of the following:

searching the reference information for information related to the repair condition or the selection determined inappropriate, and modifying data content of the repair condition or the selection by inferring an appropriate repair condition from repair history of similar components and units,         modifying data content of the repair condition or the selection on basis of a pass/fail ratio for each error code of the inspection in the repair information or the component-level repair information, and         modifying data content of the repair condition or the selection on basis of a pass/fail ratio for each code of repair content of the inspection in the repair information or the component-level repair information.

* * * * *